No. 892,930. PATENTED JULY 7, 1908.
M. W. BROWN.
FLEXIBLE JOINT.
APPLICATION FILED JULY 19, 1907.

3 SHEETS—SHEET 1.

WITNESSES:

INVENTOR
M. W. Brown
BY
W. J. Fitzgerald
Attorneys

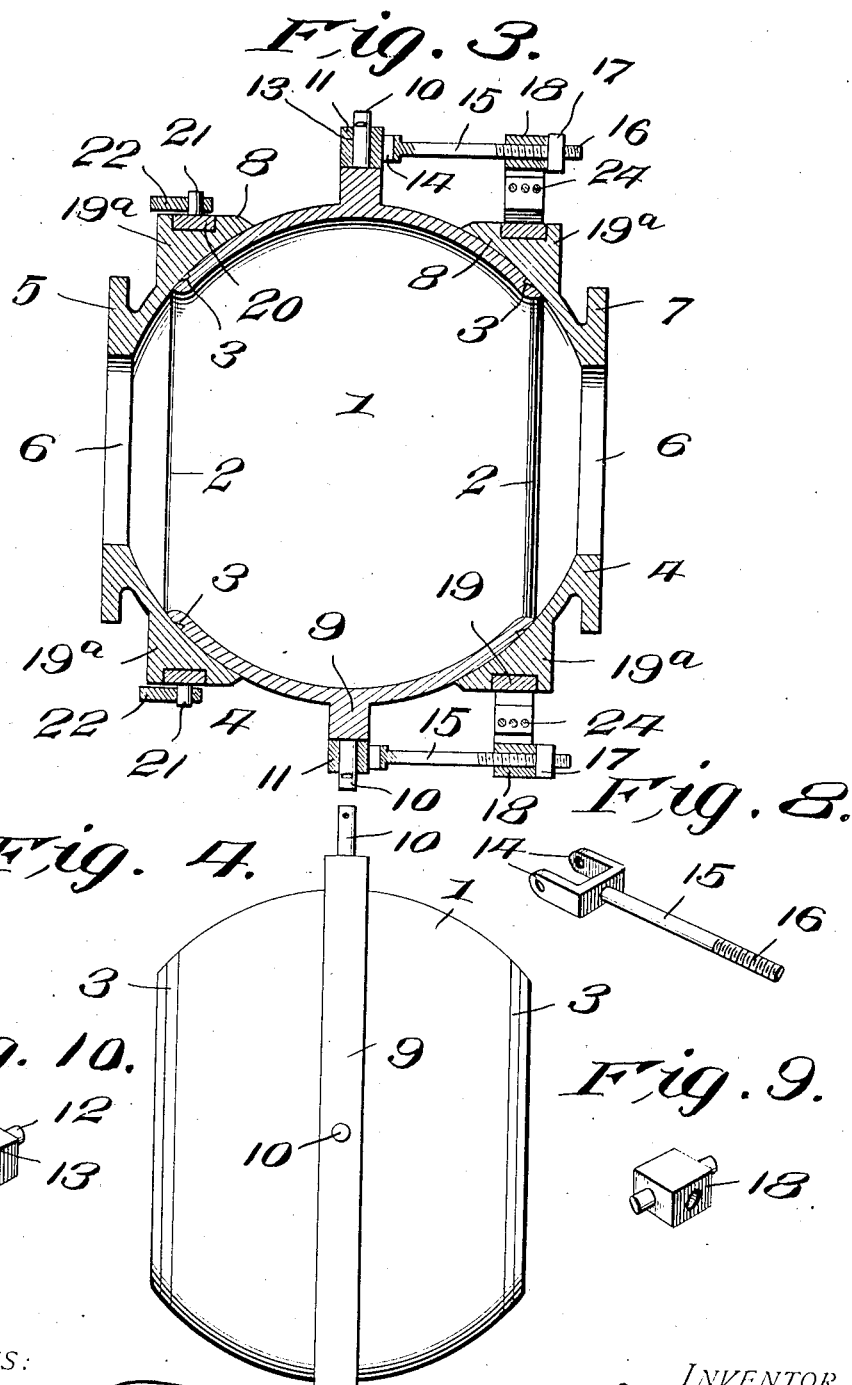

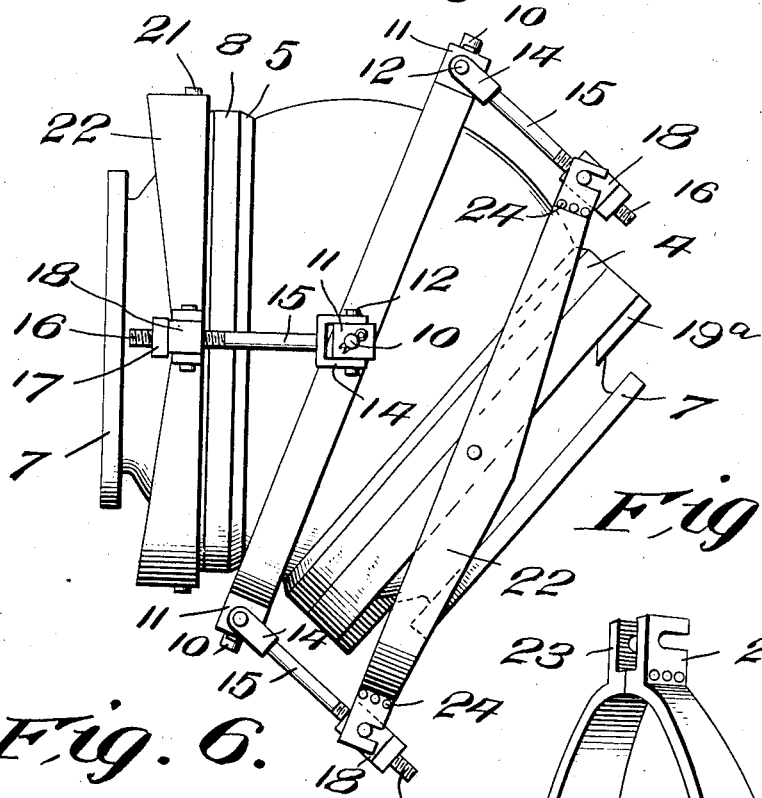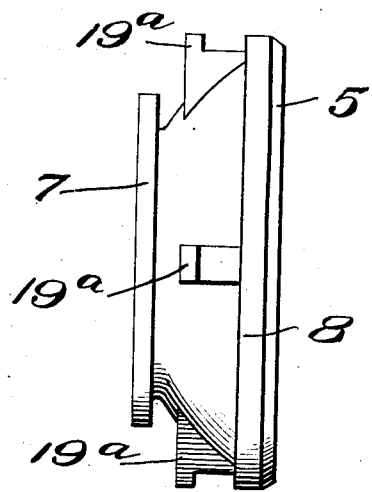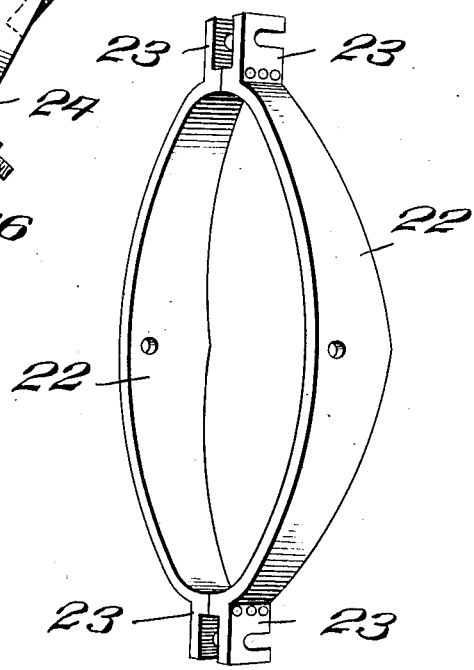

UNITED STATES PATENT OFFICE.

MARTIN WILLIAM BROWN, OF GALVESTON, TEXAS.

FLEXIBLE JOINT.

No. 892,930.  Specification of Letters Patent.  Patented July 7, 1908.

Application filed July 19, 1907. Serial No. 384,556.

*To all whom it may concern:*

Be it known that I, MARTIN WILLIAM BROWN, a citizen of the United States, residing at Galveston, in the county of Galveston and State of Texas, have invented certain new and useful Improvements in Flexible Joints; and I do hereby declare the following to be a full, clear, and exact description of the invention, such as will enable others skilled in the art to which it appertains to make and use the same.

My invention relates to a flexible union or joint for otherwise rigid pipe sections and the object of my invention is to provide a yielding joint, whereby the approximated ends of rigid pipe sections may be reliably joined together, so that the pipe line thus provided will possess great flexibility, a very important desideratum for pipes commonly employed in connection with hydraulic dredges and sand pumps as used in excavating river beds and the like.

A further object of my invention is to provide a joint of great flexibility enabling a pipe line employing my improved flexible joint to be laid around sharp bends in order to conveniently reach a given point for the discharge of the material pumped through the pipe line. By the means of my universal joint, the greatest degree of flexibility is obtained.

Other objects and advantages will be hereinafter referred to and more particularly pointed out in the claims.

Figure 1:
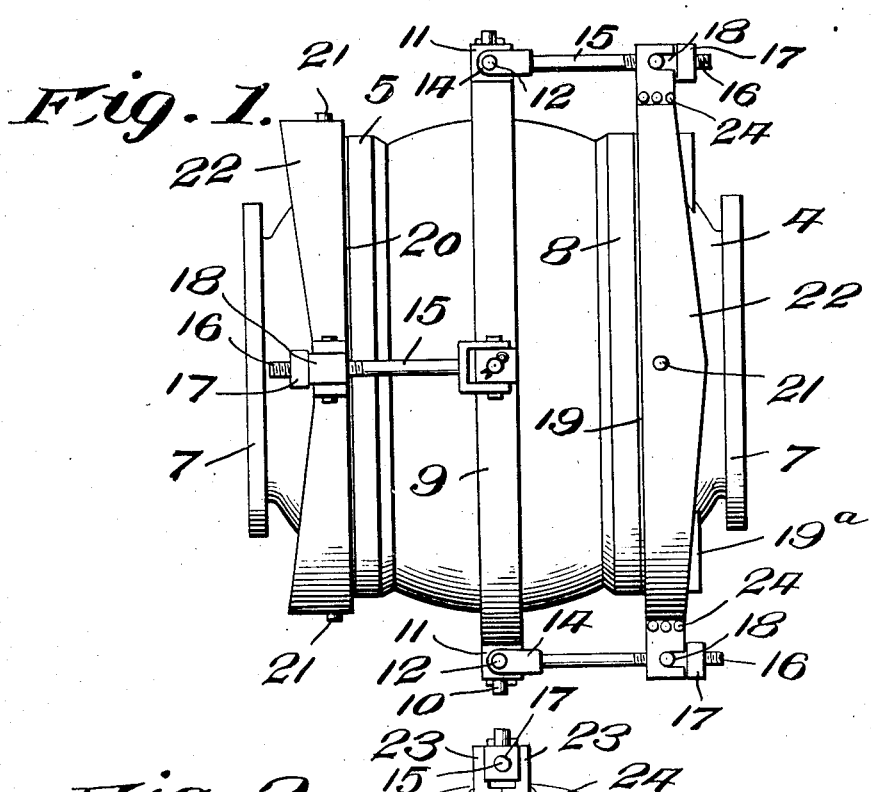
Figure 2:
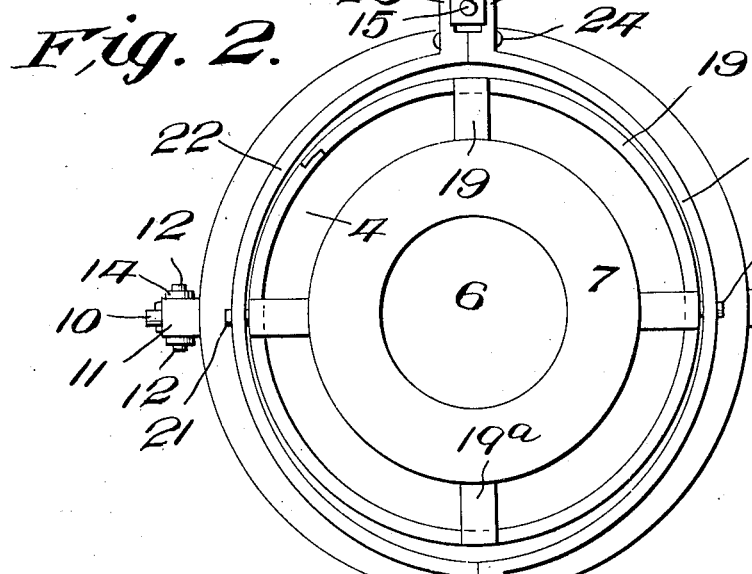

In the accompanying drawings which are made a part of this application, Figure 1 shows a side view of my universal joint ready for use. Fig. 2 is an end view thereof. Fig. 3 is a longitudinal central section. Fig. 4 is a detail showing the body section proper or planetary member. Fig. 5 shows my improved flexible joint bent to dispose the two pipe sections connected thereby at an angle. Fig. 6 shows a collar section constituting part of the harness of controlling mechanism for the parts of my universal joint, Fig. 7 shows a detail of an additional part of the harness or controlling appliance designed to hold the coöperating elements of my universal joint in union with each other. Fig. 8 is a perspective view of an arm employed for securing parts of the joints together. Fig. 9 is a perspective view of a journal block to receive one end of said arm, and, Fig. 10 is a perspective view of a compensating block for the opposite end of said arm.

Referring to the drawings in which similar reference numerals designate corresponding parts throughout the several views, 1 indicates the main or planetary body, which is substantially globular in form and open at each end, as indicated by the numerals 2 and formed around each open end is an annular groove or seat 3, for the reception of a gasket to prevent leakage, as will be hereinafter more clearly specified. Designed to coöperate with the open ends of the body section 1 are the pipe engaging sections 4 and 5, each having a suitable bore 6 to correspond with the bore of the pipe line to which the members 4 and 5 are connected in any preferred way, as by means of the flanges 7, or equivalent device. The members 4 and 5 are also provided with annular flanges 8 to receive the contiguous end of the body section 1 and slide and partially rotate thereon incident to the operation of my improved universal joint. It, therefore, becomes necessary to provide controlling means for the several parts which I have just described and with that purpose in view, I form a circumferential rib 9 preferably continuous around the body or globular member 1, having at four equi-distant points a journal or stem 10, each of which is designed to receive a compensated block 11, each of said blocks having upon diametrically opposite sides the journals or lugs 12, as shown in Fig. 10, the bore to receive the journal 10, being designated by the numeral 13. The lugs 12 are to coöperate with the yoke 14 upon the arm 15, said arm being threaded at its outer or free end as indicated by the numeral 16, to receive the locking nut 17 after said threaded stem has passed through an aperture in the journal block 18.

It will be understood that the arms 15 and coöperating members are duplicated upon diametrically opposite sides of my universal joint and when four of said arms are properly assembled at the equi-distant points around the body portion 1, a yielding mechanism or harness is provided, which will permit the members 4 and 5 to yieldingly coöperate with the open ends of the globular body 1, said member 4 moving upon or around the open end of the member 1 to compensate for the varying positions of the pipe section, with which the flange 7 is connected. By reference to Fig. 1 and other views, it will be observed that the arms 15 are arranged in pairs, two pairs extending from diametrically opposite points to the right and two pairs also at diametrically opposite points extending to the left and in order to insure that the members 4 and 5 are held closely in contact with the contiguous end of the body portion 1, I provide for each of said members 4 and 5 an encircling band designated respectively 19 and 20 fitting directly on the end sections or upon suitable brackets or seats 19ª, each of said bands having at diametrically opposite points the lugs or journals 21, adapted to enter a bore in the yoke sections 22, the ends of said yoke sections being provided with parallel extensions or connecting members 23, locked permanently together by the bolts or rivets 24, or equivalent means, it being understood that said parallel sections are separated sufficiently to fit around the journal block 18, hereinafter described.

By the construction just described it will be observed that the yoke members 23 are placed in connection with the arms 15 extending to the right in Fig. 3 and in like manner I connect the member 5 by means of the arms 15 extending towards the left with the lugs diametrically between the lugs connected with the arms reaching to the right and it will, therefore, be clearly understood that when the several parts of my invention are thus assembled and coöperatively disposed a very yielding non-leaking joint is provided and that the pipe line provided with my form of yielding joint may be laid in one continuous curve or in a series of curves, thereby especially fitting it for use as a pipe line disposed upon a plurality of barges or boats making it possible to utilize my pipe line over a body of water even though the surface thereof is rough and continuously moving.

By reason of the gasket 3 formed of any suitable material, the coöperating meeting faces of the members 4 and 5 and the globular body section will freely move upon each other, enabling the parts to promptly conform to the varying conditions of the surface of the water or soil, over which the pipe line is extended.

My improved universal joint for pipe sections will be found reliably efficient and non-leaking in character and by providing the gasket 3 of some substance impervious to water or a suitable lubricant, the contacting surfaces of the several members will promptly respond to any strain placed thereon and insure that the pipe line will conform to various conditions of the water, as before explained and that said parts will resist the action of salt water and other deteriorating influences.

In Fig. 5 I have shown my improved flexible or universal joint for pipe lines, as being disposed in a position which will place the two pipe sections connected therewith almost at right angles to each other and said pipe sections may be as readily disposed in the opposite direction, inasmuch as the members 4 and 5 will readily move over the spherical body section 1 and conform thereto and to the changing relationship of the pipe section.

The various parts of my invention may be very cheaply manufactured and readily assembled each in its respective operative position and while I have described the preferred construction and combination of parts deemed necessary in materializing my invention, I desire to comprehend in this application such substantial equivalents or substitutes as may fall fairly in the scope of my invention.

What I claim is:—

1. In a universal joint for pipe sections, the combination with a body having rounded ends, a rib around said body and journals on said rib, of pipe engaging sections to fit over the rounded ends of said body, said sections having seats, bands adapted to enter said seats, lugs on said bands, yokes adapted to journal on the lugs on the bands and flexible means interposed between the journals on said rib and the yokes, whereby the pipe engaging sections may be directed at various angles to the axis of the body.

2. In a universal joint for pipe sections, the combination with a globular body having an opening therethrough, and a circumferential rib on said body, of pipe engaging sections having bores therethrough to coöperate with the opening in the body, annular flanges on said sections adapted to receive the ends of the body seats in said flanges, bands rotatable in said seats, yokes pivotally mounted on said bands, arms between said rib and yokes, and means to flexibly secure the arms to the rib and yokes whereby the sections may be moved at an angle to the axis of the opening in the body.

3. In a flexible joint, the combination with a globular body having an opening therethrough, an annular rib at the longitudinal center of said body and stems on said rib, of pipe engaging sections, flanges on said sections adapted to fit over and engage the open ends of said body, seats surrounding said flanges, bands movably mounted in said seats, lugs on said bands, yokes pivotally mounted on said lugs, extensions on said yokes, blocks journaled between said extensions and having openings therethrough, arms adjustably mounted in said openings and means to pivotally secure said arms to the journals on the rib.

4. In a flexible joint, the combination with a globular body having an opening in each end thereof and a groove in the outer face of said body adjacent the open ends, a gasket in said grooves and a rib at the longitudinal center of the body, of pipe engaging members having openings therein to coöperate with the openings in the body, annular flanges on said sections having curved inner faces to coöperate with the curvature of the body, seats surrounding said flanges, bands movably mounted in said seats, yokes pivotally secured to said bands and means to flexibly secure said yokes to the rib on the body.

In testimony whereof I have signed my name to this specification in the presence of two subscribing witnesses.

MARTIN WILLIAM BROWN.

Witnesses:
C. D. ADRIANCE,
S. A. BISBY.